(12) United States Patent
Bhushan et al.

(10) Patent No.: US 11,675,667 B2
(45) Date of Patent: Jun. 13, 2023

(54) SMART AUTOMATION OF RELIABLE DIFFERENTIAL BACKUPS OF ALWAYS ON AVAILABILITY GROUP DATABASES TO OPTIMIZE THE RESTORE TIME

(71) Applicant: EMC IP Holding Company LLC, Hopkinton, MA (US)

(72) Inventors: Bharat Bhushan, Bangalore (IN); Niketan Narayan Kalaskar, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 148 days.

(21) Appl. No.: 17/224,384

(22) Filed: Apr. 7, 2021

(65) Prior Publication Data
US 2022/0327025 A1    Oct. 13, 2022

(51) Int. Cl.
*G06F 16/20* (2019.01)
*G06F 11/14* (2006.01)
*G06F 16/23* (2019.01)

(52) U.S. Cl.
CPC ...... *G06F 11/1451* (2013.01); *G06F 11/1469* (2013.01); *G06F 11/1474* (2013.01); *G06F 16/2379* (2019.01); *G06F 2201/87* (2013.01)

(58) Field of Classification Search
None
See application file for complete search history.

(56) References Cited

U.S. PATENT DOCUMENTS

| | | | |
|---|---|---|---|
| 9,984,112 B1* | 5/2018 | Wang | G06F 16/11 |
| 2005/0081099 A1* | 4/2005 | Chang | G06F 11/1466 |
| | | | 714/15 |
| 2007/0288490 A1* | 12/2007 | Longshaw | G06F 16/217 |
| 2009/0248756 A1* | 10/2009 | Akidau | G06F 11/004 |
| | | | 707/999.203 |

* cited by examiner

*Primary Examiner* — Jau Shya Meng
(74) *Attorney, Agent, or Firm* — Workman Nydegger

(57) ABSTRACT

One example method includes performing data protection operations including backup operations. Backups of an availability group include a full backup, transaction log backups, and differential backups. Each differential backup includes transactions since the full backup. The differential backups are performed based on a trigger and, during a restore operation, the differential backups reduce the number of restores that need to be performed and can be restored instead of restoring the corresponding transactional log backups.

20 Claims, 6 Drawing Sheets

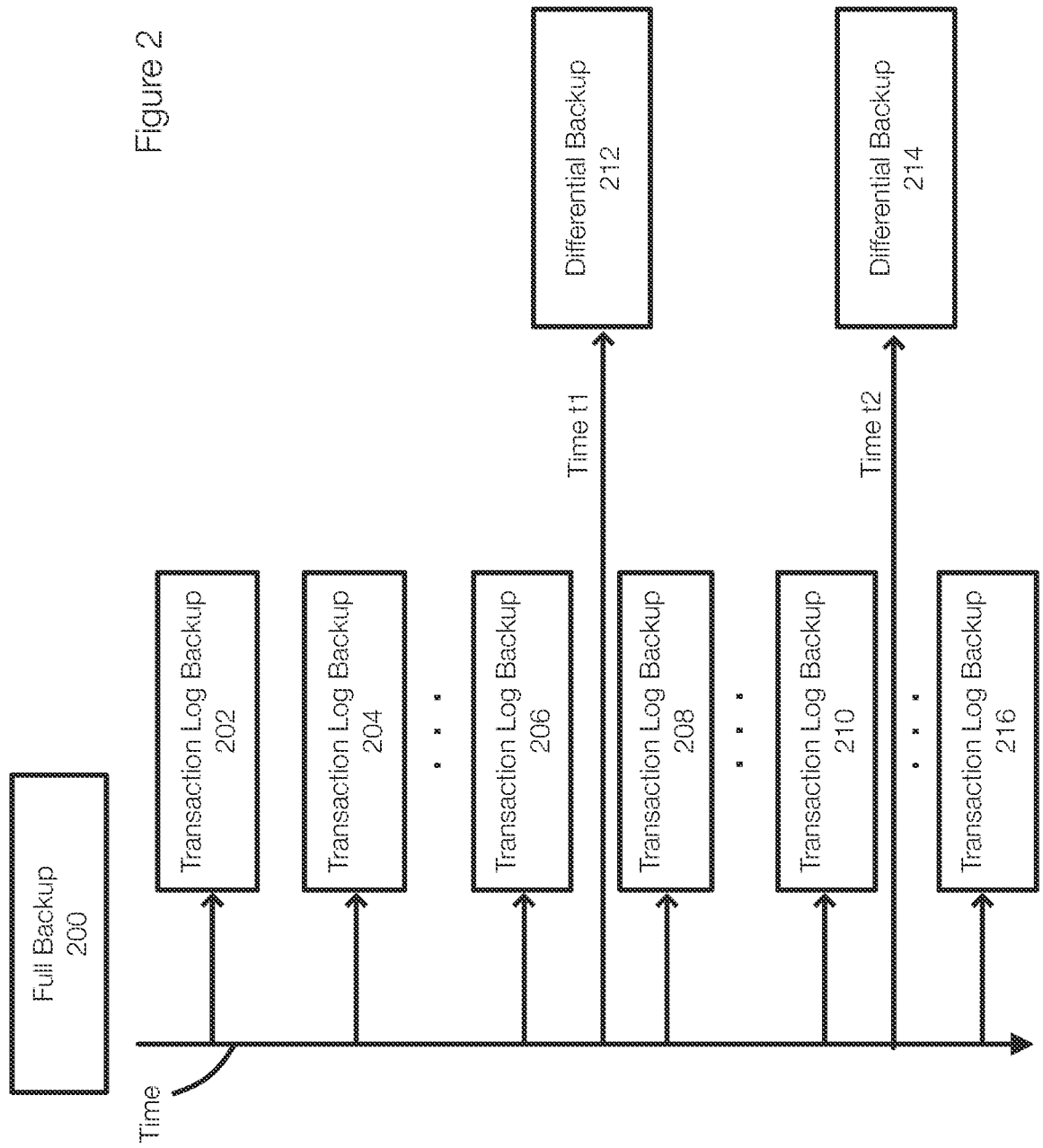

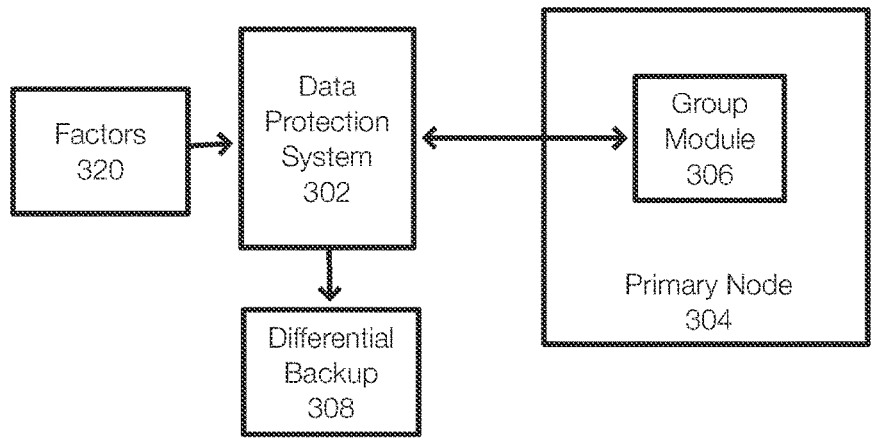

Figure 3A

| AAG SQL HOST/Server | SQL Database part of AAG | Backup Level | MODE |
|---|---|---|---|
| AAG Name AG1 | SQL Database 150 | FULL | USER SCHEDULED |
| AAG Name AG1 | SQL Database 150 | TXNLOG1 | USER SCHEDULED |
| AAG Name AG1 | SQL Database 150 | TXNLOG2 | USER SCHEDULED |
| AAG Name AG1 | SQL Database 150 | TXNLOG...35 | USER SCHEDULED |
| AAG Name AG1 | SQL Database 150 | DIFF1 | SYSTEM PROMOTED |
| AAG Name AG1 | SQL Database 150 | TXNLOG36 | USER SCHEDULED |
| AAG Name AG1 | SQL Database 150 | TXNLOG37 | USER SCHEDULED |
| AAG Name AG1 | SQL Database 150 | TXNLOG70 | USER SCHEDULED |
| AAG Name AG1 | SQL Database 150 | DIFF2 | SYSTEM PROMOTED |

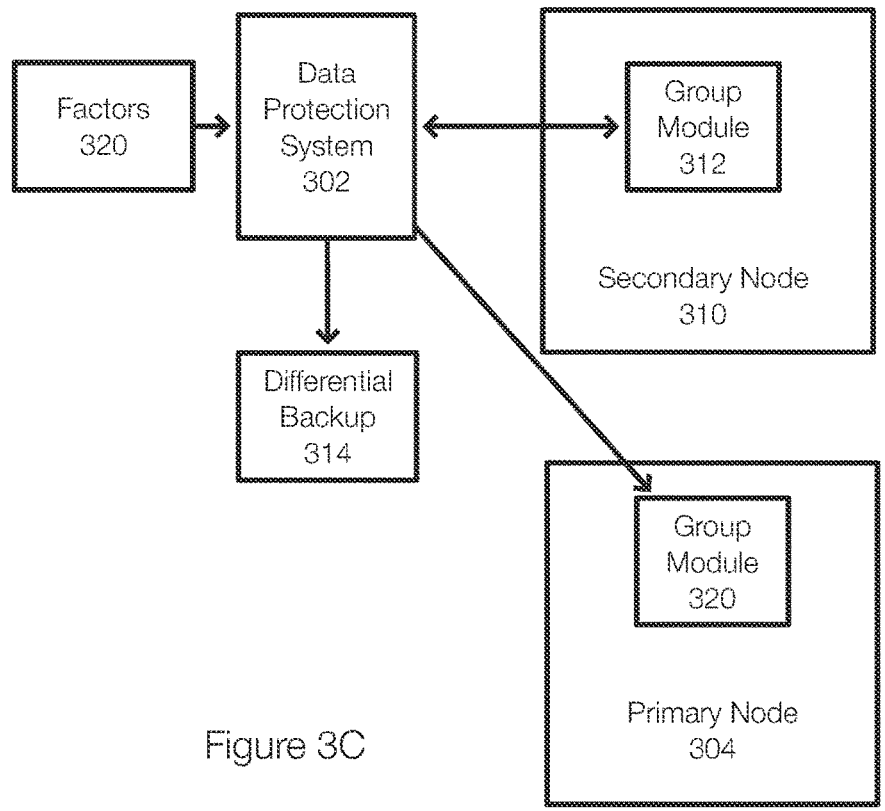

Figure 3C

| AAG SQL HOST/Server | SQL Database part of AAG | Backup Level | MODE |
|---|---|---|---|
| AAG Name AG1 | SQL Database 150 | FULL | USER SCHEDULED |
| AAG Name AG1 | SQL Database 150 | TXNLOG1 | USER SCHEDULED |
| AAG Name AG1 | SQL Database 150 | TXNLOG2 | USER SCHEDULED |
| AAG Name AG1 | SQL Database 150 | TXNLOG....35 | USER SCHEDULED |
| AAG Name AG1 | SQL Database 150 | DIFF1 | SYSTEM PROMOTED ON PRIMARY NODE |
| AAG Name AG1 | SQL Database 150 | TXNLOG36 | USER SCHEDULED |
| AAG Name AG1 | SQL Database 150 | TXNLOG37 | USER SCHEDULED |
| AAG Name AG1 | SQL Database 150 | TXNLOG70 | USER SCHEDULED |
| AAG Name AG1 | SQL | | SYSTEM PROMOTED ON PRIMARY NODE |

SMART AUTOMATION OF RELIABLE DIFFERENTIAL BACKUPS OF ALWAYS ON AVAILABILITY GROUP DATABASES TO OPTIMIZE THE RESTORE TIME

FIELD OF THE INVENTION

Embodiments of the present invention generally relate to data protection. More particularly, at least some embodiments of the invention relate to systems, hardware, software, computer-readable media, and methods for performing data protection operations including backup and/or restore operations of group databases in high availability groups.

BACKGROUND

Always on group databases often refer to systems that support a replicated set of user databases. An availability group may include a primary node and secondary nodes. Typically, the primary node is read/write to clients and transactions at the primary node may be synchronized to the secondary nodes. One of the benefits of high availability group is that if the primary node fails, operations can fail over to one of the secondary nodes.

When backup operations are performed on an availability group, the backup server may be configured to perform a full backup of the group (e.g., of the databases) and then regularly perform transaction log backups. For example, a full backup may be performed for the availability group and transaction log backups may be performed every 15 minutes.

Transaction log backups are sequential in nature and, when combined with the first full backup, form a backup chain from the first full backup to the most recent transaction log backup. This allows the group to be restored to different points in time and ensures that a recent backup exists. This arrangement, however, may lead to problems when a restore operation is required.

For example, the 96$^{th}$ transaction log backup of a database may be selected for a restore operation. This means that the database is associated with at least 97 backups. When restoring a availability group that has 10 databases, each database will be associated with 97 backups. A recovery operation would thus require 970 restore operations (one for each of the backups).

As a result, the entire recovery process may require a large amount of time, depending on the number of transaction logs being restored and the size of the transaction log backups. Further, the restore operation may fail for many reasons including session timeout, failure to trigger a restore pertaining to long command line argument, overuse of host memory and processor resources, or the like.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 3A discloses aspects of generating differential backups from a primary node of an availability group;

FIG. 3B discloses aspects of a media catalog for the backups of an availability group;

FIG. 3C discloses aspects of generating differential backups from a secondary node of an availability group;

FIG. 3D discloses aspects of a media catalog for the backups of an availability group;

DETAILED DESCRIPTION OF SOME EXAMPLE EMBODIMENTS

Embodiments of the present invention generally relate to data backup and restore processes. More particularly, at least some embodiments of the invention relate to systems, hardware, software, computer-readable media, and methods for performing data protection operations including backup and restore operations in an availability group such as an always on availability group (AAG) database.

In general, example embodiments of the invention relate to performing backup operations and/or restore operations for an availability group or other system. The backups may include full backups, transaction log backups, differential backups, or the like or combination thereof.

Embodiments of the invention relate to automated differential backups, which may be based on specified variables or factors, and transaction log backups of a high availability servers (e.g., an SQL AAG Servers or server group). More specifically, embodiments of the invention generate automated differential backups.

For example, if backups are being generated from a primary node of an availability group, a differential backup may be triggered based on various factors. The differential backup may be triggered after a certain number of transactional log backups have been performed, when a size of the transactional log backups reaches a predetermined size, after a certain time period, or the like or combination thereof.

If the backups (e.g., transaction log backups) are being generated from a secondary node, a backup process may be launched, if necessary, on the primary node to perform the differential backup. Once completed, the transactional log backups may resume from the secondary node.

Figure 1:
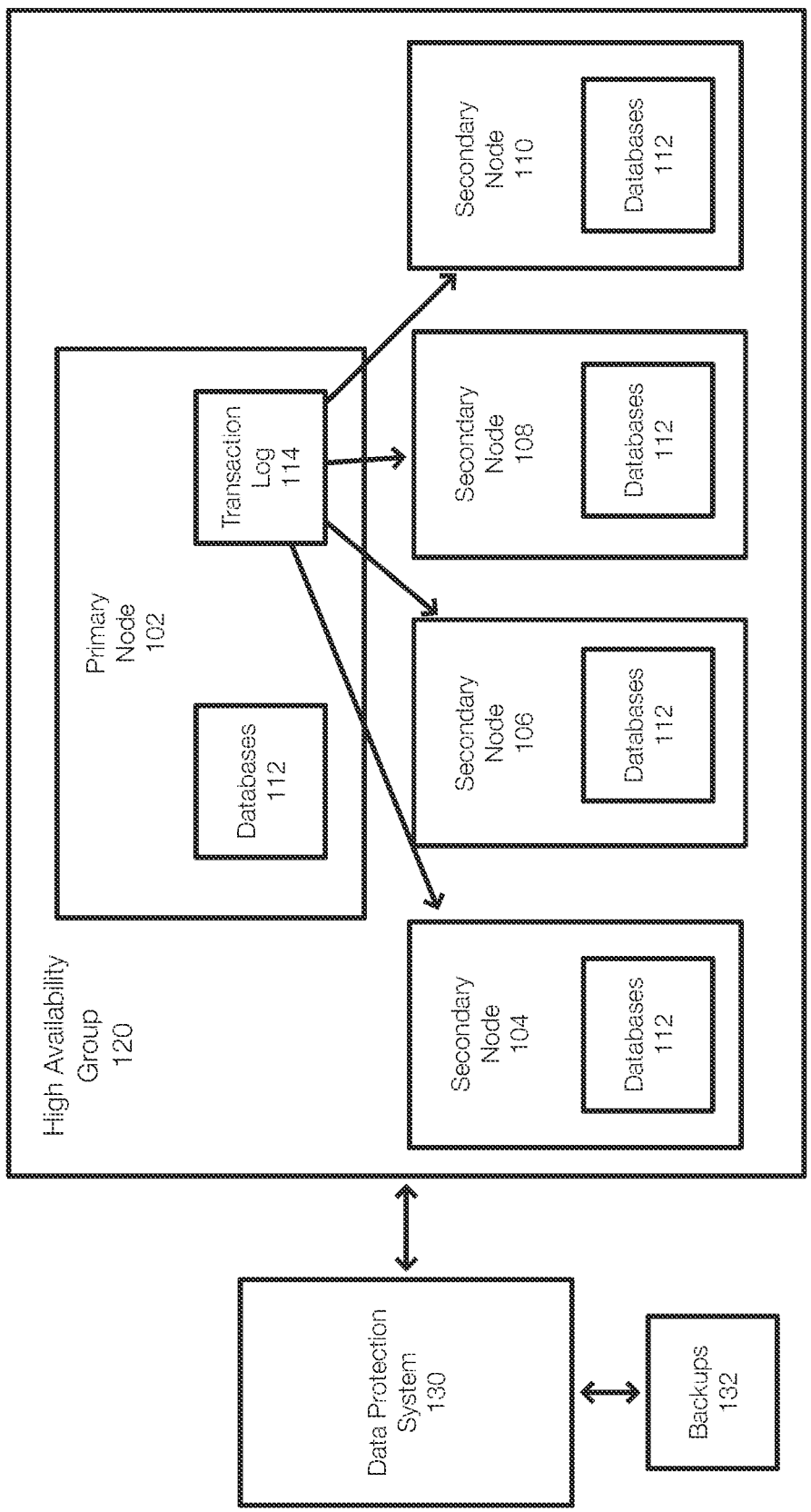
FIG. 1 discloses aspects of a data protection system configured to generate reliable differential backups in an availability group FIG. 2 discloses aspects of differential backups in an availability group.

FIG. 1 illustrates an example of a data protection system configured to perform data protection operations in or on a computing system. More specifically, FIG. 1 illustrates a data protection system 130 (e.g., a backup server) that is configured to perform data protection operations including backup operations and restore operations on an availability group 120, an example of which is an AAG SQL database group. The group 120 may be an on-premise group, a cloud-based group, and may be physical or virtual in nature.

The high availability group 120 includes multiple nodes including a primary node 102 and secondary nodes, which are represented by secondary nodes 104, 106, 108, and 110. During some operations, such as a failover operation, one of the secondary nodes may become the primary node.

Each of the nodes in the group 120 is associated with databases 112 (e.g., n databases). The databases 112 on the primary node 102 can be read by clients and written to by clients. A transaction log 114 may be associated with the primary node 102. The transaction log 114 includes transactions (e.g., changes) made to the databases 112 that are then distributed to the secondary nodes 104, 106, 108, and 110. The secondary nodes 104, 106, 108, 110 receive and apply the transactions to their respective copies of the databases 112. Thus, the databases 112 at the primary node 102 are replicated to the secondary nodes 104, 106, 108, 110. In one example, each database may be associated with a different transaction log. Thus, if there are 10 databases in the availability group, the generation of a transaction log backup may generate 10 transaction log backups.

The data protection system 130 is configured to generate backups 132, which may be stored in a local storage device, cloud-based storage, or the like or combination thereof. In some examples, the backups may be stored within the group 120.

The data protection system 130, which may include a backup server, is configured to generate a full backup of the databases 112 or of the group 120. The full backup 120 may be generated on a schedule such as daily, weekly, or the like and may be generated from a specific node (e.g., the primary node or a secondary node). In addition, once a full backup is generated, a transaction log backup of the transaction log 114 is generated based on factors or triggers. For example, the transaction log backup may be triggered in a time-based manner. A transaction log backup may be generated every 15 minutes.

The data protection system 130 may also be configured to generate differential backups. In one example, a differential backup represents a number of transaction log backups into a single backup. The differential backup, however, may generated independently of the transaction log backups. This can simplify a restore operation by reducing the number of backups that need to be performed. For example, after generating the $25^{th}$ transaction log backup after a full backup, a differential backup may be generated. The differential backup may include all transaction since the full backup. The differential backup may also include transactions that are not present in the 25 transaction log backups.

FIG. 2 discloses aspects of transaction log backups and differential backups. FIG. 2 illustrates a chain of backups that includes a full backup 200 and transactional backups 202, 204, 206, 208, 210, 216. The transaction log backups 202, 204 and 206 may represent a total of n transaction log backups. The transaction log backups 208 and 210 may also represent n transaction log backups.

The transaction log backups 202, 204, 206, 208, 210, 216 may be generated according to a predetermined schedule or on another basis. As previously described, a restore operation based on the transaction log backup 210 would require a restore to be performed for the full backup 200 and for the transaction log backups 202, 204, 206, 208, 210.

FIG. 2 also illustrates differential backups 212 and 214. In this example, the differential backup 212 includes all of the transactions included in the transaction log backups 202, 204, and 206 and the differential backup 214 includes all of the transactions included in the transaction log backups 202, 204, 206, 308, and 210. In one example, the differential backups 212 may include transaction from the transaction log backup 206 to time $t_1$. The differential backup 214 may include transactions from the transaction log backup 210 to time $t_2$. In this example, the transaction log backup 208 may include transactions since the differential backup 212.

The differential backups 212 correspond to n transaction log backups (n can be user selected or based on other reasons such as size of the transaction log backups and the differential backup 214 corresponds to 2n transaction log backups in one example. The differential backup 212 at time $t_1$ contains all of the changes that have occurred to the database since the full backup 200 up to time $t_1$ and the differential backup 214 at time $t_2$ contains all of the changes that have occurred since the full backup 200 up to time $t_2$. In another example, the differential backup 214 may also correspond to n transaction log backups. In one example, the transaction log backup following a differential backup is based on transactions since the differential backup. In another example, the transaction log backup following a differential backup is based on transactions from the most recent transaction log backup. During a restore, in the event transactions in the various backups are duplicated, duplicate transactions may be discarded or the like.

Advantageously, generating differential backups periodically or based on other factors can simplify the restore operation. For example, performing a restore operation based on the transaction log backup 208 requires the restoration of 3 backups: the full backup 200, the differential backup 212, and the transaction log backup 208. Without the differential backup 212, a restore operation based on the transaction log 208 would require a restore operation for the full backup 200 and m restore operations for the transaction log backups 202, 204, 206, and 208.

For example, the transaction log backups 202, 204 and 206 may represent 35 transaction log backups. Thus, restoring from the transaction log 208 with the differential backup 212 requires 3 restore operations and restoring without the differential backup 212 requires 37 restore operations. Embodiments of the invention substantially reduce the number of restore operations that may need to be performed. For example, if n is 35, restoring the differential backup 212 replaces 35 restore operations.

In this example, the differential backup 214 reflects at least 2n transaction log backups while the differential backup 212 reflects at least n transaction log backups. Further, the transaction log backups are typically retained such that a restore can be performed based on any of the transaction log backups. For example, the ability to restore from the transaction log backup 204 is not lost by the generation of the differential backups 212 and 214.

The generation of differential backups may depend on which node the data protection system is operating on or with. FIGS. 3A-3D disclose aspects of a data protection system configured to protect an availability group such as an always on availability group.

In one example, the transaction log backup 208 may include transactions since the transaction log backup 206. Alternatively, the transaction log 208 includes transactions since the differential backup 212.

FIG. 3A discloses aspects of performing data protection operations from the perspective of a primary node of an availability group. More specifically, FIG. 3A illustrates a data protection system 302 configured to perform data protection operations on an availability group where the backups are performed from a primary node 304. In other words, the backups are running on the primary node 304. The data protection system 302 may provide a group module 306 instantiated on the primary node 304 to aid in the data protection operations. The group module 306 may cooperate with the data protection system 302 or backup server to generate the backups discussed herein.

The data protection system 302 is configured to generate a full backup of the group or its databases and to generate transaction log backups from the primary node 304. In addition, the data protection system 302 is configured to generate differential backups, represented by the differential backup 308 in FIG. 3A. In one example, the differential backup 308 may be generated based on factors 320. The factors may include size of the transaction log backups or cumulative size of recent transaction log backups, number of transaction log backups, time, or the like or combination thereof. As a result, the generation of the differential backup 308 may be triggered based on the factors 320.

Once the differential backup 308 is generated, the generation of transaction log backups may resume. The generation of the differential backup 308 does not impact the generation of the transaction log backups. Further, the differential backup 308 may not impact the chain of transaction log backups. Advantageously, differential backups can reduce the recovery time objective (RTO).

The data protection system 302 may also generate a media catalog, as illustrated in FIG. 3B. The media catalog 350 in FIG. 3B illustrates a sequence of backups for a particular database (e.g., database 150, which is an example of databases 112 in FIG. 1). The backups start with a full backup. In this example, a differential backup is generated after every 35 transaction log backups. Thus, the differential backups diff1 and diff2 in the media catalog 350 were generated, respectively, after the creation of transaction log backups 35 and 70. The differential backups are identified as system promoted.

FIG. 3C discloses aspects of generating backups for a computing system such as an availability group. In FIG. 3C, the transaction log backups are generated from a secondary node 310. A group module 312 may be running on the secondary node and may coordinate with the data protection system 302 to generate the transaction log backups.

When a differential backup is triggered based on the factors 320, a group module 320 may be executed on the primary node 304. Thus the differential backup 314 is generated from the primary node 304. The corresponding media catalog 352, illustrated in FIG. 3D, illustrates and the differential backups diff1 and diff2 in this example are system promoted on the primary node. Embodiments of the invention are able to generate differential backups regardless of whether the backups are running on the primary node or the secondary node.

The catalogs 350 and 352 help differentiate between differential backups and transaction log backups. Further, backups on the primary and secondary nodes may be indexed against the cluster or group name. As a result, this ensures that the backup chain is intact and that the backup and restore operations can be performed reliably. More specifically, because a common indexing may be used regardless of whether the backups were performed from a primary node or a secondary node, restores can be performed on any node of the availability group.

Figure 4:
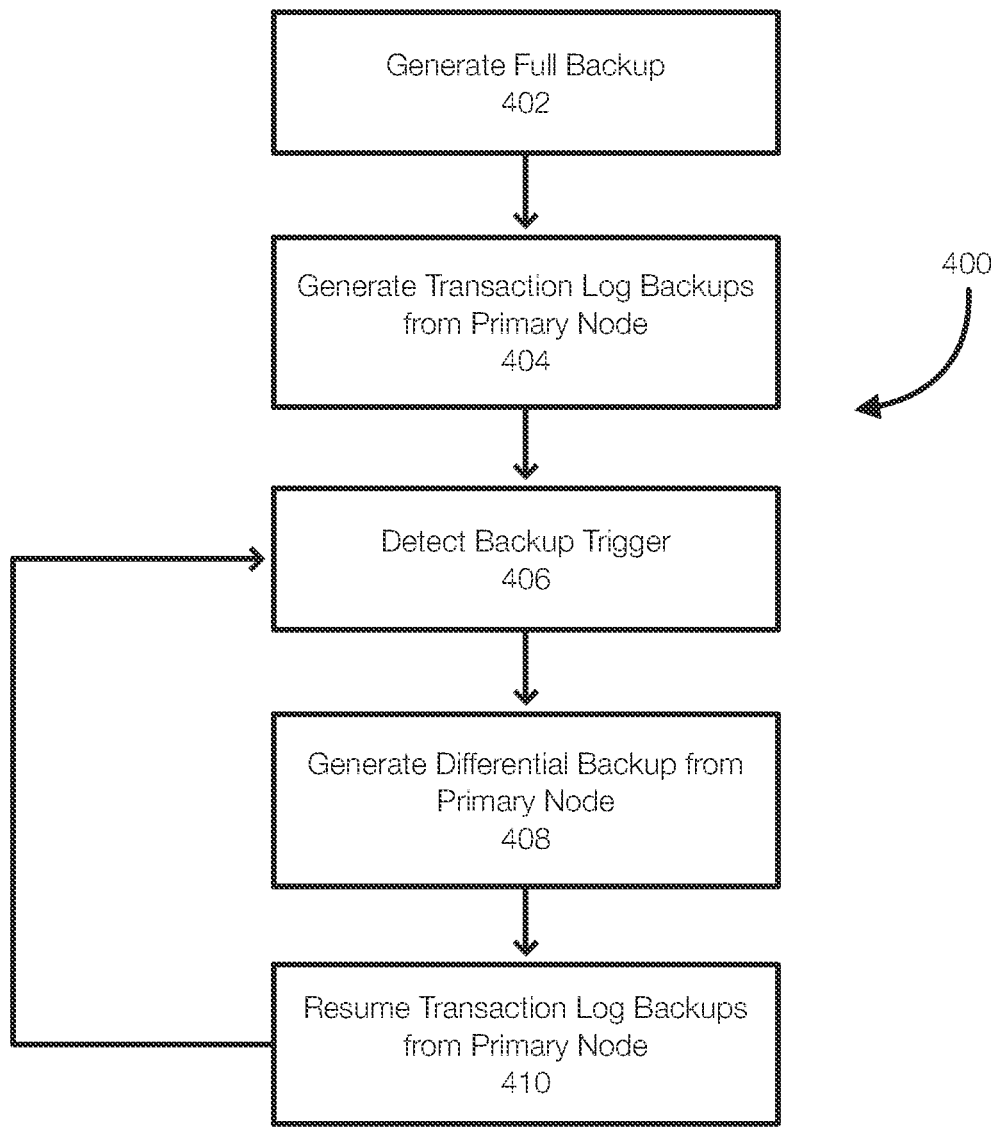
FIG. 4 discloses aspects of a method for generating backups including a differential backup when backing up from a primary node.

FIG. 4 discloses aspects of a method for performing data protection operations such as a backup operation. Some of the elements of the method 400 may not be performed each time the method is performed but may be performed at startup or periodically. For example, a full backup is typically performed less often than other backup types.

Initially, a full backup of databases (one or more databases) in an availability group is generated 402. Then transaction log backups are generated 404 from the primary node of the availability group in this example. Next, a trigger is detected 406. Stated differently, the data protection system may determine that criteria for performing a differential backup have been satisfied. For example, a predetermined number of transaction logs may have been performed or the size of the transaction log backups may exceed a predetermined size or threshold.

In response to the trigger, a differential backup is generated 408 from the primary node. The differential backup, in one example, includes all transactions since the generation of the full backup. Subsequent differential backups generated in response to subsequent triggers may also include all transactions since the generation of the full backup. In one embodiment, a differential backup may only include transactions since the most recent differential backup. However, by including all transactions since the most recent full backup, the number of backups to restore can be reduced.

After the differential backup is generated 408, the generation of transaction log backups may resume 410. This process repeats when the next trigger is detected.

Figure 5:
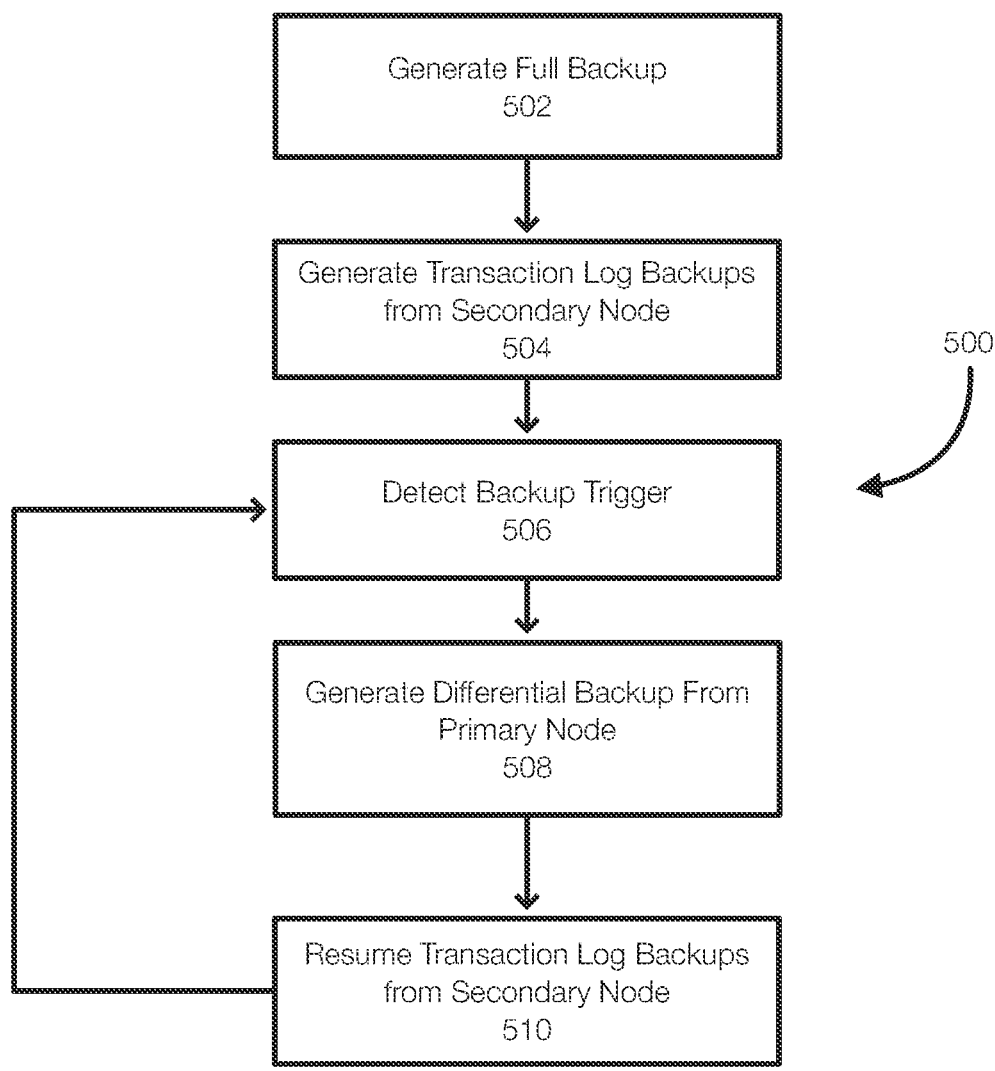
FIG. 5 discloses aspects of a method for generating backups including a differential backup when backing up from a secondary node.

FIG. 5 discloses aspects of a method for performing data protection operations in a computing system such as an availability group. The method 500, however, is distinct from the method 400 at least because the transaction logs are generated from a secondary node.

Thus, a full backup is generated 502 and transaction logs are then generated 504 from a secondary node. When a trigger is detected 506 (or criteria for performing a differential backup are satisfied), a differential backup is generated 508 from the primary node. After the differential backup is generated, the generation of transaction log backups from the secondary node resumes. This process repeats at the detection of the next trigger.

A restore or recovery operation is discussed with respect to FIG. 2. If the transaction log backup 202 is selected for restore, the restore operation restores the full backup and then restores the transaction log backup 202.

If the transaction log backup 208 is selected for restore, the restore operations restores the full backup, the differential backup 212, and the transaction log backup 208.

If the transaction backup 216 is selected for restore, the restore operation restores the full backup, the differential backup 214 and any transaction backup logs up to the transaction log backup 216 that were generated after the transaction log backup 210.

The number of recovery operations performed in embodiments of the invention is reduced substantially at least compared to situations where differential backups are not present. This advantageously reduces the time required for the entire recovery operation and improves the performance of the recovery operations. Embodiments of the invention reduce or minimize issues related to session timeout, remove failure causes, reduce resource usage, and reduce or minimize RTOs for critical assets.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Such operations may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect to the example method of Figure(s) XX that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method, comprising: generating transaction log backups of a database operating in an availability group, wherein each transaction log backup includes transactions in the database and wherein the availability group includes a primary node and secondary nodes, detecting a trigger to perform a differential backup;

generating the differential backup, wherein the differential backup includes all transactions in the database since a full backup of the database, and resuming the generation of the transaction log backups of the database.

Embodiment 2. The method of embodiment 1, further comprising generating the transaction log backups from a primary node generating the differential backup from the primary node.

Embodiment 3. The method of embodiments 1 and/or 2, further comprising generating the transaction log backups from a secondary node and generating the differential backup from a primary node.

Embodiment 4. The method of embodiments 1, 2, and/or 3, wherein the trigger comprises performing a predetermined number of the transaction log backups.

Embodiment 5. The method of embodiments 1, 2, 3, and/or 4, wherein the trigger comprises a size of the transactional log backups.

Embodiment 6. The method of embodiments 1, 2, 3, 4, and/or 5, further comprising generating a second differential backup based on a second trigger, wherein the second differential backup includes all transactions in the database since the full backup of the database.

Embodiment 7. The method of embodiments 1, 2, 3, 4, 5, and/or 6, further comprising generating a media log that includes for each backup, a backup level and a mode, wherein the mode is one of full, user scheduled, system promoted on primary node, or system promoted.

Embodiment 8. The method of embodiments 1, 2, 3, 4, 5, 6, and/or 7, further comprising performing a restore operation based on a specific transactional log backup by restoring the full backup, the most recent differential backup and all transaction log backups from the most recent differential backup to the specific transactional log backup.

Embodiment 9. The method of embodiments 1, 2, 3, 4, 5, 6, 7, and/or 8, further comprising generating the differential backup without deleting any of the transaction log backups.

Embodiment 10. The method of embodiments 1, 2, 3, 4, 5, 6, 7, 8, and/or 9, further comprising indexing all backups such that the restore operation can be performed on any node in the availability group.

Embodiment 11. A method for performing any of the operations, methods, or processes, or any portion of any of these, disclosed herein and/or in embodiments 1-10 or combinations thereof.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

An example computing device, which may a physical or virtual node, may include memory such as random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   generating, by a processor, transaction log backups of a database operating in an availability group, wherein each transaction log backup includes transactions in the database and wherein the availability group includes a primary node and secondary nodes;
   detecting, by the processor, a trigger to perform a differential backup;
   generating the differential backup by the processor, wherein the differential backup includes all transactions in the database since a full backup of the database; and
   resuming the generation of the transaction log backups of the database.

2. The method of claim 1, further comprising generating the transaction log backups from a primary node generating the differential backup from the primary node.

3. The method of claim 1, further comprising generating the transaction log backups from a secondary node and generating the differential backup from a primary node.

4. The method of claim 1, wherein the trigger comprises performing a predetermined number of the transaction log backups.

5. The method of claim 1, wherein the trigger comprises a size of the transactional log backups.

6. The method of claim 1, further comprising generating a second differential backup based on a second trigger, wherein the second differential backup includes all transactions in the database since the full backup of the database.

7. The method of claim 1, further comprising generating a media log that includes for each backup, a backup level and a mode, wherein the mode is one of full, user scheduled, system promoted on primary node, or system promoted.

8. The method of claim 1, further comprising performing a restore operation based on a specific transactional log backup by restoring the full backup, the most recent differential backup and all transaction log backups from the most recent differential backup to the specific transactional log backup.

9. The method of claim 8, further comprising indexing all backups, selecting a node in the availability group, and performing the restore operation on the selected node.

10. The method of claim 1, further comprising generating the differential backup without deleting any of the transaction log backups.

11. A non-transitory storage medium having stored therein instructions that are executable by one or more hardware processors to perform operations comprising:
    generating transaction log backups of a database operating in an availability group, wherein each transaction log backup includes transactions in the database and wherein the availability group includes a primary node and secondary nodes;
    detecting a trigger to perform a differential backup;
    generating the differential backup, wherein the differential backup includes all transactions in the database since a full backup of the database; and
    resuming the generation of the transaction log backups of the database.

12. The non-transitory storage medium of claim 11, further comprising generating the transaction log backups from a primary node generating the differential backup from the primary node.

13. The non-transitory storage medium of claim 11, further comprising generating the transaction log backups from a secondary node and generating the differential backup from a primary node.

14. The non-transitory storage medium of claim 11, wherein the trigger comprises performing a predetermined number of the transaction log backups.

15. The non-transitory storage medium of claim 11, wherein the trigger comprises a size of the transactional log backups.

16. The non-transitory storage medium of claim 11, further comprising generating a second differential backup based on a second trigger, wherein the second differential backup includes all transactions in the database since the full backup of the database.

17. The non-transitory storage medium of claim 11, further comprising generating a media log that includes for each backup, a backup level and a mode, wherein the mode is one of full, user scheduled, system promoted on primary node, or system promoted.

18. The non-transitory storage medium of claim 11, further comprising performing a restore operation based on a specific transactional log backup by restoring the full backup, the most recent differential backup and all transaction log backups from the most recent differential backup to the specific transactional log backup.

19. The non-transitory storage medium of claim 11, further comprising generating the differential backup without deleting any of the transaction log backups.

20. The non-transitory storage medium of claim 11, further comprising indexing all backups, selecting a node in the availability group, and performing the restore operation on the selected node.

* * * * *